(12) United States Patent
Smith

(10) Patent No.: US 7,860,760 B2
(45) Date of Patent: Dec. 28, 2010

(54) METHOD FOR ACQUIRING AND LINKING A PLURALITY OF FIELDS FROM A PLURALITY OF DATA SOURCES INTO A DATA SUPPLY CHAIN OF LINKED FIELDS

(76) Inventor: Stanley Benjamin Smith, 1304 Brooks Ave., Raleigh, NC (US) 27607

( * ) Notice: Subject to any disclaimer, the term of this patent is extended or adjusted under 35 U.S.C. 154(b) by 1145 days.

(21) Appl. No.: 11/487,230

(22) Filed: Jul. 14, 2006

(65) Prior Publication Data
US 2008/0015962 A1 Jan. 17, 2008

(51) Int. Cl.
*G06F 30/00* (2006.01)
(52) U.S. Cl. .................. 705/26.5; 705/26.81; 705/27.1
(58) Field of Classification Search .................. 705/26, 705/27
See application file for complete search history.

(56) References Cited

U.S. PATENT DOCUMENTS 6,925,607 B2 * 8/2005 Szlam et al. ............... 715/762
7,574,376 B1 * 8/2009 Berman et al. .............. 705/26
7,725,811 B1 * 5/2010 Bedell et al. ............... 715/200
2004/0260658 A1 * 12/2004 Dettinger et al. ........... 705/400
2004/0267595 A1 * 12/2004 Woodings et al. .............. 705/9
2007/0130132 A1 * 6/2007 Wu et al. ...................... 707/4

OTHER PUBLICATIONS

Business Objects: "Business Objects Delivers . . . Platform," Business Wire, May 8, 2005; Dialog file 610 #0001279450, 4pgs.*
Brio "Brio Pushes Information . . . ," Computergram International, Nov. 5, 1997; Dialog file 16 #0532473, 3pgs.*
Hyperion: "Hyperion unveils . . . ," PR Newswire, Feb. 24, 2004; Dialog file 613 #01117326, 6pgs.*

* cited by examiner

*Primary Examiner*—Robert M. Pond

(57) ABSTRACT

A business method and policy set that links fields from data sources distributed across multiple servers and owned by multiple users into a single data supply chain that that enables real time actions upon achievement of threshold conditions.

6 Claims, 5 Drawing Sheets

Structural Chart

Flow Diagram of Relationships Between Observations, Research Targets, and Elements or Data Points Figure 3. Structural Chart
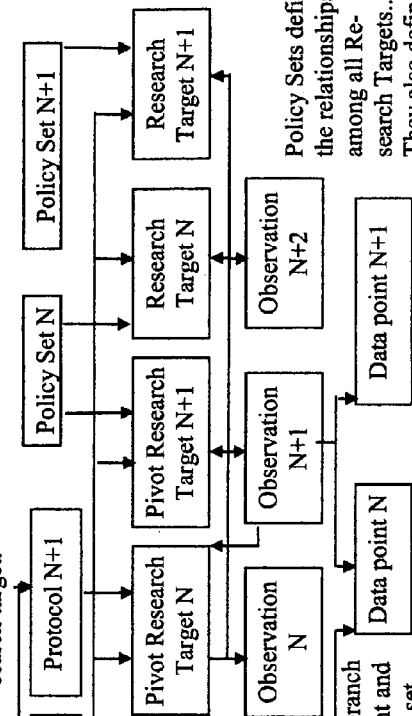
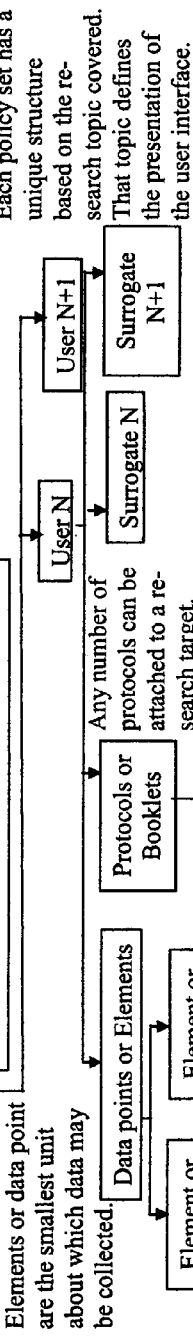
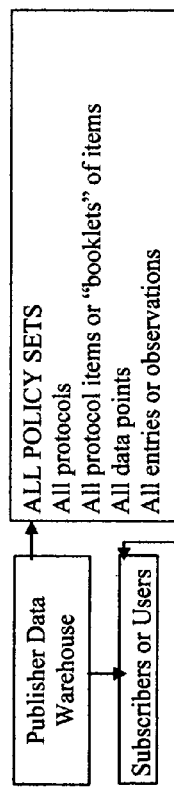
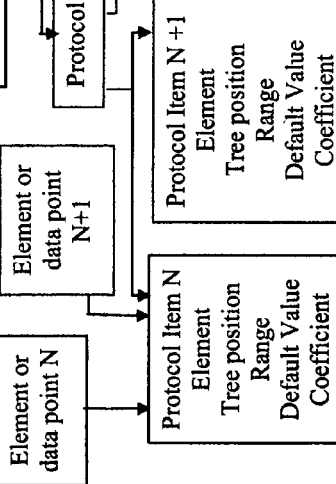

Figure 4. Report Algorithm Overview

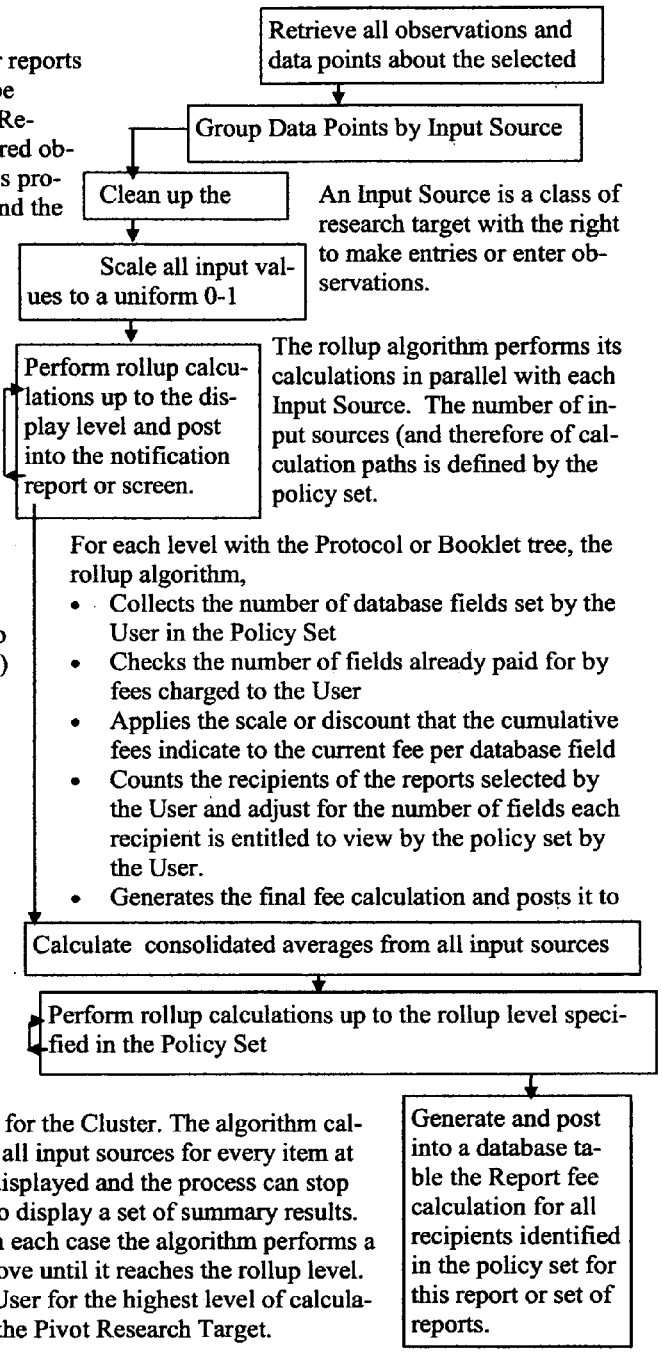

The algorithm calculates the fee for reports as a result of the fields selected to be placed into the report for the Pivot Research Target from a number of stored observations about the target. A user is provided a wizard to select the fields and the recipients of the reports.

Each observation correlates with at least one data point, a reference to a single protocol item selected from a protocol or booklet, and the input value. Data point are calculated by groups of identical input sources. The number and category of input sources is set by the User for the policy set.

After getting rid of invalid data points (zero coefficient, out of range, invalid data point, invalid user.) All Input Values are scaled to the same scale.(Items, scales, value)

For each level within the Protocol or Booklet tree(s), the Rollup Algorithm determines the average or the default value for the item(s) at that level. Items at the missing replacement level receive a default value if there are no values at or below that level. It rescales the co-efficients (weights) proportionately among the items having a value (items with no value are ignored) and calculates the weighted average or the value for the given level.

The display level is set by the user for the Cluster. The algorithm calculates the weighted average from all input sources for every item at the display level. The results are displayed and the process can stop here. The User might also decide to display a set of summary results. from the consolidated averages. In each case the algorithm performs a number of additional rollups as above until it reaches the rollup level. The rollup level is defined by the User for the highest level of calculation and gives the final results for the Pivot Research Target.

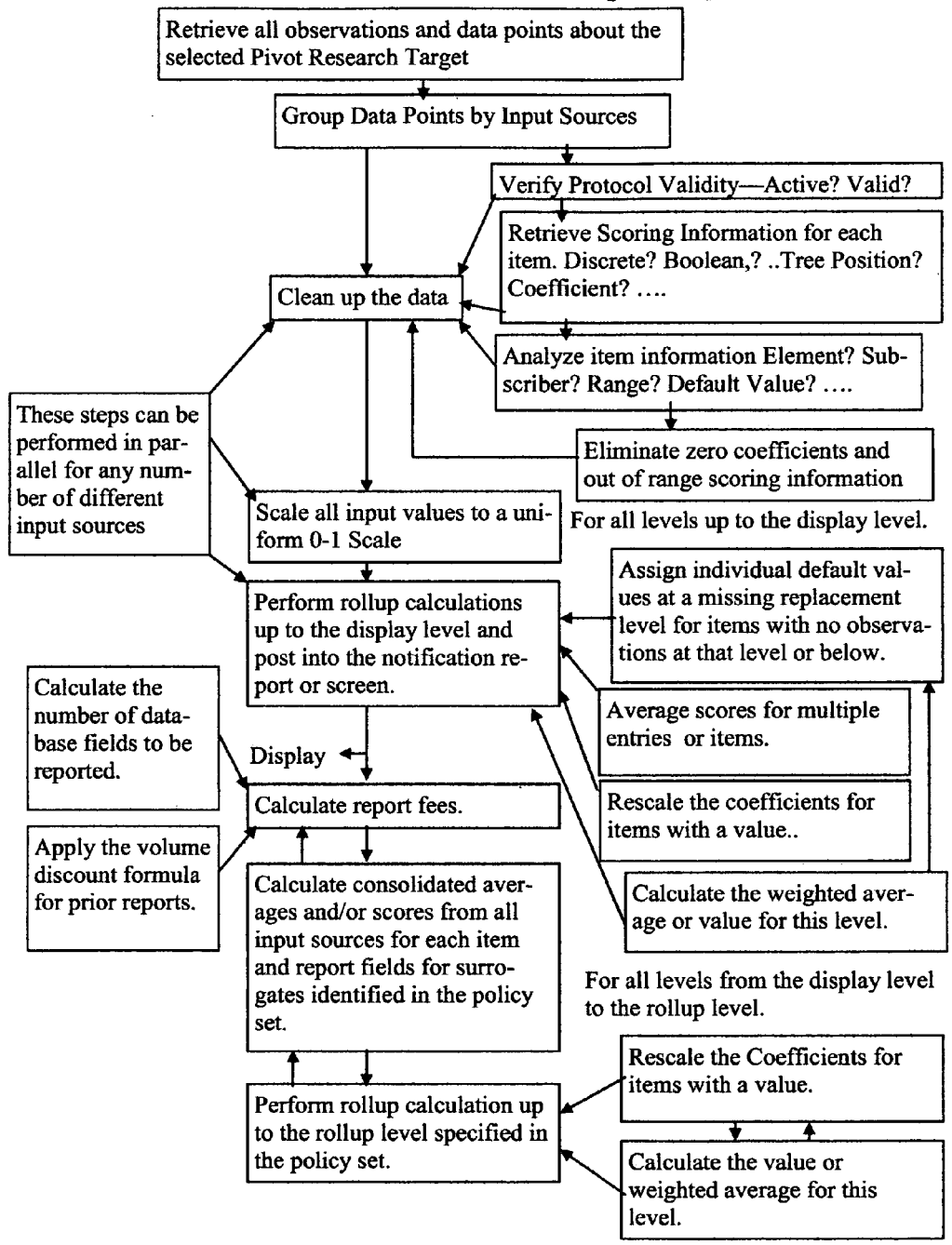
Figure 5.   Report Algorithm Detail

METHOD FOR ACQUIRING AND LINKING A PLURALITY OF FIELDS FROM A PLURALITY OF DATA SOURCES INTO A DATA SUPPLY CHAIN OF LINKED FIELDS

BACKGROUND OF THE INVENTION

1. Field of the Invention

This invention relates a business method and process for managing data accumulation and pricing the use of accumulated data, and, in particular, to receiving instructions and delivering customized sets of information or reports from a database at a fee per database field.

2. Description of the Related Art

Databases enable users to enter and access an almost unlimited amount of information. There are many variations for pricing access to or use of a database. Some vendors price the right to input data; some price the complexity of the database; some price the software that creates the database; some price access to the site housing the database; some price the number of reports of the data; some charge a subscription fee for use of the database; and some charge for time on the web server. Mailing list database vendors and other vendors of data price by the subset of the data in the database, but the vendor sets up the database fields and the entry and administration process. In the case of this invention; the end user is constructing the database and establishing the methods and procedures for inputs and reports through a service that provides the infrastructure to accomplish the unique and individual data collection and reporting requirements of the end use. The invention is a business method and process to enable the configuration and management of the "data supply chain" for the user of the invention, from determining the data fields to be input through to the user and the vendor calculating a fee per data field that provides the user with an option to approve or acknowledge the price prior to the generation or distribution of a report.

There has been a need for a method to manage costs for data input and management in order for a data generator and consumer to control their costs for reports and assurance that the data delivered to them or their surrogates through said reports is usable and appropriate for their unique knowledge management or business intelligence needs. We have coined the term "data supply chain" to help those with fiduciary roles or interests within businesses or organizations to view the management of their data as a cost center subject to pricing schedules and planning. This method will reduce the user's risk of getting unstructured data or insufficient data or too much data or data routed to inappropriate recipients from a database. The vendor is similarly assured that compensation for the use of their back end database structure; the software to capture data and report it; and the cost of the website and other infrastructure to house the database and provide users with access to it is in direct proportion to the user's drawing down of the data fields in the database. Notification of the User of the cost for the data report prior to generation and dispersion of the report also insures utility of the information to the user and therefore a win-win relationship with the vendor.

A web portal or local area network can accept a configuration profile specifying the data to be collected and other data input and structure rights and roles defined by the user. For example, a particular user may be interested in the current price of a piece of equipment, the performance indicators entered by users of that equipment, a listing of the employees who are using that equipment, and the ROI for the piece of equipment. When a user of a database driven website or local area network requests a report, the website or web portal owner or the vendor of the database design and configuration software then automatically builds the report and forwards it to the user or his surrogates.

Traditional web portals and local area networks do allow users to specify customized reports through configuration profiles. They do not enable a data supply chain process to be established from the configuration of the data fields; to the setting of policies for contributions to the dataset; and the setting of policies for reports; determining the price for the report to be provided on the fly by the database field; or notifying and receiving approval from the end user of a report.

SUMMARY OF THE INVENTION

The present invention is directed to a web or network-based service where different sets of customized information are entered into a database and then extracted as reports to be delivered at different times to different recipients (i.e., the user or different surrogates of the user) selected by the user. For example, a user may desire to have a customized set of data points such as risk indicators captured by the database over the last quarter delivered to the company risk manager. A user may also desire to have another or the same set of customized data points delivered in a slightly different configuration to the training and development manager.

In accordance with the principles of the present invention, a user accesses a website or portal or local area network, and builds a configuration profile which specifies the data fields and other information or content to be input, collected, and processed. The user may configure a report or set of reports to be delivered later automatically or to be made available on demand. The user has flexibility in identifying a particular surrogate or destination and defining a format for the database report. In cases where the user desires the report to be delivered, the user sets specified times in the form of a schedule and specified destinations (i.e., surrogates) for the delivery of the database report. The user also has flexibility in selecting the format for the delivery of the report. Sometimes, the format is dictated by the selection of vehicle for delivery, e.g., email, or a PDF document. However, some users may want to receive reports in more than one format, e.g., a user may have the capability to receive information through email, PDF, xml, or csv format. Depending on the implementation, one or more customized reports or sets of reports can be delivered to one or more users or surrogates of users as a function of the specified report format or the specified time or both.

In one embodiment, the invention is a website server configured to provide access to a user via a web based user interface into which data is entered and processed and then reported out based on user requests. The network-based server also comprises a GUI that collects data from a single or a plurality of sources. Then, at specified times, these data are processed into reports and are delivered to one or more report recipients in formats defined or configured by the user. In this embodiment, a csv file, an xml file, a PDF file, an excel spreadsheet, and other possible formats can be chosen. A software program may be loaded onto a local PC or Network Server with configuration and setup options similar to those described for the Web. Thus, data may be entered or gathered by the user and the user's surrogates on a local machine in real time. The wizards and setup processes to configure the data collection protocols and the user rights and roles are parallel to or analogous to those for the Web interface. Calculation of pricing is also parallel to or analogous to the Web interface. In the case of a local network, rather than a Web interface, the notification of the pricing is sent to the owner of the software at the website and the processing of payment proceeds in the same manner it does for the website user.

In another embodiment, the present invention is a method for configuring a database and generating reports from that database to a user accessing a local network-based service in combination with a Web based service. The local phase comprises the steps of creating the data entry formats and input rights of the user and the user's surrogates. A routine scheduled uploading of the data to the Web based service for the reporting of the data and pricing of the reports to be handled by the Web based service side as the second phase. The advantage and purpose for this embodiment is to enable the user to draw reports from the broader database that includes data contributed by collaborators who do not have access to the user's local network.

BRIEF DESCRIPTION OF THE DRAWINGS

Other aspects, features, and advantages of the present invention will become more fully apparent from the following detailed description, the appended claims, and the accompanying drawings in which:

FIG. 3 is a block diagram illustrating various components in accordance with one embodiment of the present invention focusing on the relationship and interaction of the user with the database;

FIG. 4 shows a block diagram representing exemplary processing implementing the invention focusing on the calculation process for generating report fee calculations and other calculations;

FIG. 5 is a flow diagram illustrating various components in accordance with one embodiment of the present invention as it calculates report fees and performs other calculations.

DETAILED DESCRIPTION OF THE DRAWINGS AND HOW THEY EMBODY THE INVENTION

Figure 1:
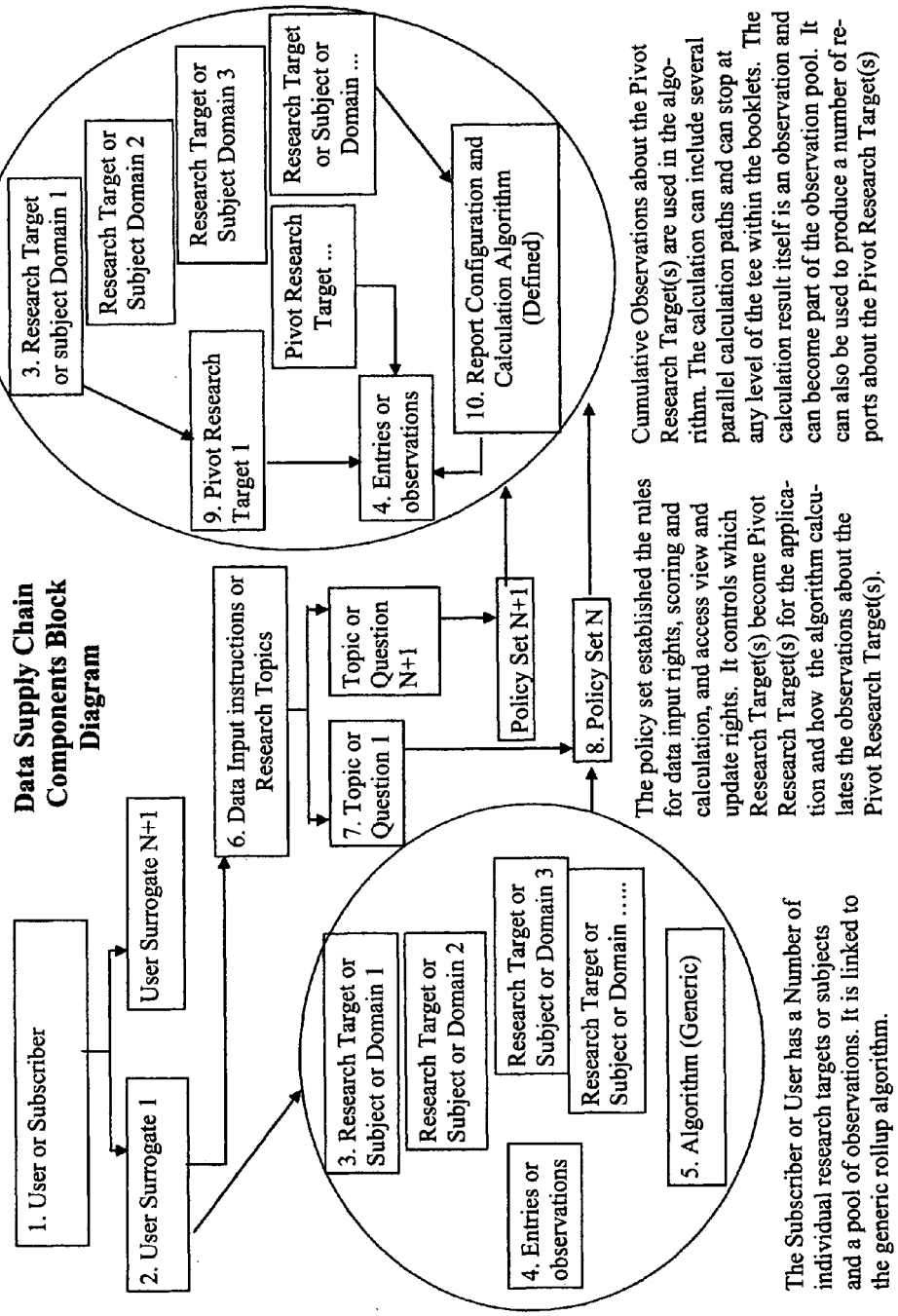
FIG. 1 is a block diagram illustrating various components in accordance with one embodiment of the present invention focusing on the database.

The present invention is a web-server or a network-based service wherein one or more customized reports is drawn from a database configured by a user to be delivered to the user to the user's surrogates at specified times in specified formats at a price per data field.

The user will build a configuration profile in accordance with the present invention. This configuration file is a web server or network-based data file that specifies the back-end database and its operation and also: the data fields to be accumulated; data entry and edit rights and roles for the user and the user's surrogates; forms and formats for capturing, reporting, structuring and calculating data entered; rules to trigger notifications and for generating reports; rules and processes to configure reports for the user and the user's surrogates; and rules to distribute reports to the user or the user's surrogates in specified report formats at specified times. For example, a user may create a configuration profile which requests that on weekdays, performance ratings of employees that are 3 or lower on a likert scale should be delivered to the employee's Department Head every morning at 6:00 AM; and on Fridays, only performance ratings of employees that are 4 or above on a Likert scale be delivered to the Department Head at 10:00 AM. The configuration profile may include more than one set of report configuration and requests. For example, the configuration profile may also include a request of equipment utilization and customer complaints to be delivered at 2:00 PM everyday to his office computer with subsets of the report delivered to supervisors who report to him with data about their subordinates only.

According to the principles of the present invention, first, a user creates a configuration profile which includes requests for one or more customized reports. The configuration profile also specifies a preferred format and preferred time for delivery of each report. The user has the option to also set cumulative or individual price thresholds to trigger a notification of the price for the next round of reports.

A web server or a network-based server owned or operated by a service provider or a user stores the configuration profile created and data input by the user and the user's surrogates, and then at scheduled times, prepares and automatically delivers the requested reports to the specified recipients. The web-server or network-based server is configured to automatically deliver the requested information at the scheduled times, however, the user can override the report configuration, the delivery time, or the recipients in order to manage costs and address other data supply chain considerations.

During the preparation of each report, the data fields are posted from the dataset assigned to the user. This may include comparative or benchmark data fields from other users on the site that have entered into agreements for data sharing. After building one or more customized reports, if necessary, the software converts the format of the report into the format specified in the configuration schema set by the user, e.g., csv or xml.

The principles of the present invention provide users and/or service providers flexibility to improve upon their existing services. To improve the quality of the data entry protocols or forms, the website administrator and users may provide best of class templates for the business process, knowledge management or business intelligence domain. Collaborating researchers who opt to share their protocols may also contribute data formats, protocols, templates and policies.

The user may also have the option of improving upon the existing service by enabling other enrichment of the data supply chain process such as doing remote administration via a telephone or other devices. For example, the user may redirect reports to a device other than a Personal Computer that has internet access.

The principles of the invention may be expanded to enhance services provided by the service provider, e.g., the service provider may append applications that further enrich the quality utility and ease of using the data supply chain, such as scheduling tools, advanced calculation or analysis tools, and collaborative infrastructure tools and resources.

FIG. 1 is a block diagram of one embodiment of the present invention. In this embodiment, the principles of the present invention are illustrated in the context of Internet-based services accessing and configuring the database to house the data fields that will be reported our as part of the data supply chain.

A (1) User of a network-based service in accordance with the principles of the present invention is connected to the internet address of a service provider via a user computer or similar device used for accessing the Internet. The service provider may be any vendor who is licensed to use the database and the software that drives this invention. In general, such service provider will usually be an Internet service provider. Interconnection between the service provider and user computer may be a land-line connection or a wireless connection.

The (1) User has registered as a User or a Subscriber to the data supply chain services on the website and entered contact and billing information as well as identified his (2) Surrogates and assigned them to roles or positions. The (1) User also defines his (3) Research Targets or (3) Subjects or (3) Domains and assigns these in various configurations to his surrogates. The (1) User establishes his (6) Data Input Instructions or his (6) Research Topics and configures each (7) Topic or (7) Question. Through configuring the topics and questions the user builds a data supply chain protocol or booklet. The (1) User may, at this stage, elect to connect particular (2) Surrogates with (6) Topics to establish relationships between them for reporting.

The (1) User now builds his (8) Policy Set to establish relationship among different components of the invention. The (8) Policy Set links back to the (3) Research Target established by the (1) User and establishing the business rules for accessing the invention and inputting (4) Entries or (4) Observations and for the manner the (5) Algorithm will perform calculations. The (8) Policy Set additionally is linked by the (1) User to one or more (9) Pivot Research Targets. The connection to the (9) Pivot Research Targets links the (4) Entries or Observations with the (10) Algorithm so the business rules established by the (8) Policy Set can be applied to the calculation of both the data and fees for the reports of the data.

As the User builds relationships between protocols and persons, and protocols and roles and defined the labels for fields and relationships among fields, the data supply chain emerges. As the entries or observations are accumulated in the database, the algorithm implements the Policy Set to perform calculations upon fields and field contents, and posts these into reports as instructed by the User in the Report Configuration and Calculation Algorithm.

The (1) User has tremendous flexibility in creating a configuration profile for the data supply chain. In one implementation, the user is presented with a series of graphical user interfaces (GUIs) through the internet asking the user to enter or select preferences through a wizard driven interface; but there are other possible embodiments of the invention including tabular, drop down selection, and radio button selections that can configure the implementation of the invention.

After the customized reports have been prepared for the user or the user's surrogates according to the Policy set, the report may be, if necessary, changed into alternate formats. If the report has been converted into another format, it is delivered to the user or the user's surrogates in the format at the time or times indicated in the Policy Set.

Figure 2:
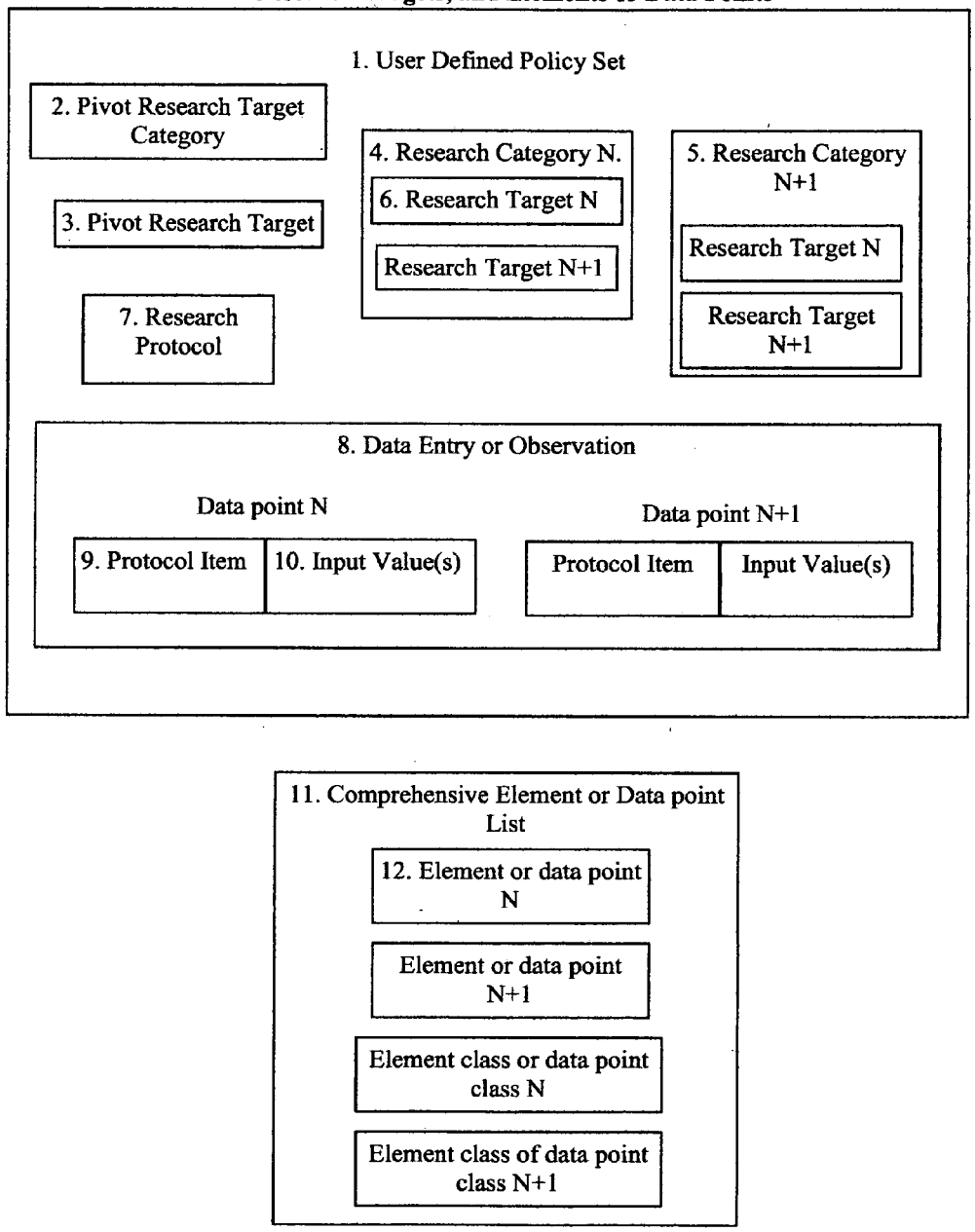
FIG. 2 shows a flow diagram representing exemplary processing implementing the invention focusing on the relationships between items in the database.

FIG. 2 shows a Flow Diagram of the relationships between observations, research targets and data points for the data supply chain process illustrated in FIG. 1 according to one embodiment of the present invention. As shown in FIG. 2, the user creates or defines a (1) Policy Set that establishes a (2) Pivot Research Target Category. By Pivot Category is meant the class or set of targets that can contain any of n number of specific research targets. The category would be the label for the class of research targets. Within each class, there can be multiple sets of targets such as the (3) Pivot Research Target n. Within each Pivot Research Target there can be one or more (4) Research Categories. Research categories are sets of (6) Research Targets which can relate across sets of (5) Research Categories with their own Research Targets. In effect an entire network of hierarchically linked objects of research can be linked together with the lowest level Research Target being the actual subject of the research associated with a (7) Research Protocol.

The Research Protocol is the set of instructions that links the access rights and other policies of the Research Target to the (8) Data Entry or Observation. An Observation consists of at least one (9) Protocol Item and at least one (10) Input Value. Any number of (8) Observations can be linked to any number of (9) Protocol Items and (10) Input Values. A Research Protocol also houses a subset of the (11) Comprehensive Element or Datapoint List housed in the master (publisher) database. These are the fields that will end up being reported and for which a report generation fee will be charged according to this embodiment of the invention. Each (12) Element or Datapoint has a set of potential attributes such as its mask, its question type, and its (10) Input Value options.

FIG. 3 shows a Structural Chart flow diagram representing exemplary processing implemented within the embodiment of the invention. It is designed to show the relationship between the master or publisher database, users, policy sets, protocols, observations, and datapoints.

FIG. 4 shows how the Algorithm processes the components in this embodiment of the invention up to and including pricing the report.

FIG. 5 shows additional details of how the Algorithm prepares and calculates the data entered and report requests.

The principles of the present invention are flexible. For example, data may be downloaded in real-time or queued on a user's to be downloaded at a specified time. Also, a user may create his configuration profile days or even months in advance. It should be noted that the user can build and accrete additional Policy Sets to enable the software to manage many or even all aspects of the user's data supply chain. The user has flexibility to change the policy sets in the configuration profile. For example, the user may elect to change the times or content of a report. The changes may be made in a variety of ways. For example, the user may access a calendar (not shown) to select a year, month, and day corresponding to a new specified time. The user may select the specified time with even more precision (e.g., hours and minutes) by using a time-of-day filed within the calendar.

The user may request changes in the selection of the target for notifications, e.g., change the routing of a report from an internal accountant to an external accounting firm. The user also has flexibility in selecting a desired format for the report. Depending on the implementation, the user have drop down configuration options tot point and click formats or targets or notification triggers.

Also, the principles of the invention include providing control capabilities to the user to control the labels to be used for the data fields. For one user a data field label may knockout ratio, and for another user the label for the same kind of field calculated the same way with the same policy set associated with it may be labeled "homerun ratio.

In addition to the embodiments described above, the present invention may be applied to a variety of other configurations. For example, although the invention has been described in the context of the world-wide web, the invention can also be implemented in the context of other types of computer networks, including intranets. The present invention can also be implemented in the context of accessing a server that is not a part of a larger network.

It will be further understood that various changes in the details, components, and arrangements of the parts which have been described and illustrated in order to explain the nature of this invention may be made by those skilled in the art without departing from the principle and scope of the invention as expressed in the following claims.

The invention claimed is:

1. A method for acquiring and linking a plurality of fields from a plurality of data sources into a data supply chain of linked fields, the data sources distributed on a plurality of originating servers and used by a plurality of users, the method comprising the steps of:

accessing by one or more first users of the plurality of data sources on one or more originating servers, computer readable code from a server, wherein each user builds a configuration profile designating which data source and which fields within each data source on the one or more originating servers are to be linked into a data supply chain;

accepting by the server the designated data source and fields;

instructing the server by each first user to initiate actions upon attainment of trigger conditions established for the one or plurality of fields within the data sources designated by the configuration profile;

assigning by the server one or a plurality of first users to a data supply chain and a research protocol;

accumulating fields drawn from the one or more data sources into a database or a edataset;

establishing by the server trigger conditions for actions to be performed upon the database, wherein the established trigger conditions are based upon threshold values assigned by the server;

configuring actions by the server, wherein each configured action is determined by the one or more attained trigger conditions;

observing the one or plurality of the fields linked into the data supply chain by the server, wherein the observing attains one or more of the established trigger conditions;

initiating the actions based upon the one or more attained established trigger conditions; and outputting the actions by the server in an iterative loop until all the attained trigger conditions have been serviced.

2. The method of claim 1, wherein the configuration profile built by said each user may be automated and propagated to other users.

3. The method of claim 1, wherein the accumulation of fields to be posted into a dataset may include assignment of a value to the fields for calculating a price for access to the fields or actions upon the fields or assignment of additional trigger conditions.

4. The method of claim 1, wherein the configuration profile may identify and configure collaborating users, specify fields to be shared with collaborators, and specify whether the actions of the server are reciprocal or one-way.

5. The method of claim 1, wherein the configuration profile may be static or dynamic.

6. The method of claim 1, wherein the user may be assigned permissions to contribute to or access all or part of the data supply chain.

* * * * *